(12) United States Patent
Kowalevicz (10) Patent No.: US 9,400,414 B2
(45) Date of Patent: Jul. 26, 2016

(54) METHODS AND APPARATUS FOR IMAGING WITHOUT RETRO-REFLECTION USING A TILTED IMAGE PLANE AND STRUCTURED RELAY OPTIC

(71) Applicant: Raytheon Company, Waltham, MA (US)

(72) Inventor: Andrew Kowalevicz, Alexandria, VA (US)

(73) Assignee: RAYTHEON COMPANY, Waltham, MA (US)

( * ) Notice: Subject to any disclaimer, the term of this patent is extended or adjusted under 35 U.S.C. 154(b) by 673 days.

(21) Appl. No.: 13/680,950

(22) Filed: Nov. 19, 2012

(65) Prior Publication Data

US 2014/0139630 A1 May 22, 2014

(51) Int. Cl.

| | |
|---|---|
| H01J 3/14 | (2006.01) |
| H01L 27/00 | (2006.01) |
| G03B 17/00 | (2006.01) |
| G02B 27/09 | (2006.01) |

(52) U.S. Cl.
CPC ............ *G03B 17/00* (2013.01); *G02B 27/0905* (2013.01); *G02B 27/0961* (2013.01)

(58) Field of Classification Search
CPC .... G02B 23/02; G02B 26/12; G02B 13/0095; G02B 21/361; H01L 31/0232; G01J 1/04; G01J 1/0411; G01J 1/0477
USPC ............ 250/221, 214.1, 216, 339.01, 339.06, 250/208.1; 359/362, 419, 423, 831, 838, 359/850, 855–856
See application file for complete search history.

(56) References Cited

U.S. PATENT DOCUMENTS

| | | | |
|---|---|---|---|
| 4,836,672 A | 6/1989 | Naiman et al. | |
| 5,602,393 A | 2/1997 | Gerard | |
| 5,629,492 A | 5/1997 | Gleason | |
| 5,844,727 A | 12/1998 | Partlo | |

(Continued)

FOREIGN PATENT DOCUMENTS

| | | |
|---|---|---|
| WO | 2005082027 A2 | 9/2005 |
| WO | 2006078397 A2 | 7/2006 |
| WO | 2009151660 A2 | 12/2009 |

OTHER PUBLICATIONS

U.S. Appl. No. 61/671,973.*

(Continued)

*Primary Examiner* — Pascal M Bui Pho
(74) *Attorney, Agent, or Firm* — Lando & Anastasi, LLP (57) ABSTRACT

A non-retro-reflective imaging system and methods in which a relay optic is configured to segment a source image into a plurality of slices and reimage each of the slices individually onto a rotated image plane such that a substantially in-focus reconstruction of the entire image is obtained, while substantially eliminating retro-reflection from the system. According to one example a non-retro-reflective imaging system includes a segmented relay optic configured to reimage a source image onto an image plane tilted with respect to an optical axis of the system, and further configured to slice the image volume into a plurality of image slices and spatially position the plurality of image slices such that a depth of focus of each image slice overlaps the tilted image plane. The system further includes an image sensor co-aligned with the tilted image plane and configured to produce a reconstructed image from the plurality of image slices.

14 Claims, 9 Drawing Sheets

(56) References Cited

U.S. PATENT DOCUMENTS

| | | | |
|---|---|---|---|
| 6,344,893 B1 * | 2/2002 | Mendlovic et al. | 356/3.14 |
| 6,439,728 B1 | 8/2002 | Copeland | |
| 6,721,539 B1 | 4/2004 | O'Brien et al. | |
| 6,775,049 B1 * | 8/2004 | So | 359/291 |
| 6,862,147 B1 | 3/2005 | Sonstroem | |
| 6,974,219 B1 | 12/2005 | Geneczko et al. | |
| 7,071,458 B2 * | 7/2006 | Tsukamoto et al. | 250/216 |
| 7,282,695 B2 | 10/2007 | Weber et al. | |
| 7,411,733 B2 * | 8/2008 | Toyoda et al. | 359/619 |
| 7,576,791 B2 | 8/2009 | Sonstroem | |
| 7,667,598 B2 | 2/2010 | Yenisch et al. | |
| 8,063,348 B1 | 11/2011 | Swaminathan et al. | |
| 8,228,582 B1 | 7/2012 | Pepper et al. | |
| 8,248,515 B2 * | 8/2012 | Ng et al. | 348/343 |
| RE43,681 E | 9/2012 | Wild et al. | |
| 2004/0102043 A1 * | 5/2004 | Watkins | G01N 21/9501 438/689 |
| 2006/0234191 A1 | 10/2006 | Ludman | |
| 2009/0237668 A1 | 9/2009 | Reyes, Jr. et al. | |
| 2010/0283848 A1 | 11/2010 | Adler et al. | |
| 2012/0200700 A1 | 8/2012 | Bennett et al. | |
| 2014/0016016 A1 * | 1/2014 | Berestov et al. | 348/345 |
| 2015/0085284 A1 * | 3/2015 | Auner | G01J 3/18 356/328 |

OTHER PUBLICATIONS

Chevalier, William J., "Assessment of Glint Hazard to Soldiers", U.S. Army Soldier and Biological Command, Dec. 1998.

Fulghum, David A., "Sensor Versus Sensor in Combat", http://www.aviationweek.com/aw/blogs/defense/index.jsp?plckController=Blog&plckScript=blogScript&plckElementId=blogDest&plckBlogPage=BlogViewPost&plckPostId=Blog:27ec4a53-dcc8-42d0-bd3a-01329aef79a7Post:6b5204db-3e13-4728-a30e-5408e1711e6e Jan. 7, 2010.

Mieremet, Arjan L. et al., "Retroreflection Reduction by Masking Apertures", Optical Engineering, Abstract Only, vol. 49, No. 4, Apr. 1, 2010.

US RE42,554, 07/2011, Wild et al. (withdrawn)

* cited by examiner

METHODS AND APPARATUS FOR IMAGING WITHOUT RETRO-REFLECTION USING A TILTED IMAGE PLANE AND STRUCTURED RELAY OPTIC

FEDERALLY SPONSORED RESEARCH

This invention was made with government support (Grant No. and federal agency withheld). The government of the United States has certain rights in this invention.

BACKGROUND

Imaging and optical sensing devices are widely used in both commercial and military applications. In traditional configurations of focused optical imaging or sensing systems, a sensor array is located in the image plane and oriented perpendicular to the optical axis. This configuration is necessary to keep the image in focus across the entire active area of the detector; however this configuration makes the system retro-reflective. As a result, any light not absorbed by the sensor (e.g., a camera or focal plane array sensor) is reflected and imaged directly back to the source along the same optical path as the incident light (i.e., retro-reflected). Optical augmentation (OA) systems use this property of retro-reflection to detect hidden optical systems. For example, OA uses an active light source to sweep through an environment, illuminating any optical devices, and retro-reflection leads to the "cat's eye" effect, which allows any illuminated optical systems to be identified, located and characterized.

SUMMARY OF INVENTION

Aspects and embodiments are directed to imaging without retro-reflection. According to certain embodiments, an imaging system is configured using a segmented image plane, also referred to as "sliced source" imaging, to achieve an in-focus image on an image sensor that is tilted relative to an optical axis of the system thereby avoiding retro-reflection, as discussed in more detail below. As used herein the term source, in the context of sliced source imaging, may refer to an image of an object or the object itself.

According to one embodiment a non-retro-reflective imaging system comprises a segmented relay optic configured to receive a source image having an image volume, and to reimage the source image onto a tilted image plane that is tilted with respect to an optical axis of the imaging system, the segmented relay optic further configured to slice the image volume into a plurality of image slices and spatially position the plurality of image slices such that a depth of focus of each image slice overlaps the tilted image plane, and an image sensor co-aligned with the tilted image plane and configured to produce a reconstructed image from the plurality of image slices.

In one example, the segmented relay optic includes an array of mirrors. In another example the tilt angle of the tilted image plane with respect to the optical axis of the imaging system exceeds an angle of acceptance of the foreoptics. In another example the segmented relay optic includes an array of lenses. In one example each lens in the array has a different focal length so as to produce the tilted image plane. The array of lenses may include a plurality of individual lenses coupled to a common substrate. The array of lenses may include a monolithic lenslet array. The imaging system may further comprise foreoptics configured to receive and focus incident electromagnetic radiation to provide the source image to the relay optic. In one example the foreoptics includes at least one lens. In another example the foreoptics includes a pinhole aperture. In one example the segmented relay optic includes a stepped-mirror reflector. The stepped-mirror reflector may be configured to produce a saw-tooth wavefront having a plurality of substantially flat fronts displaced in distance along the optical axis of the optical imaging system to produce the tilted image plane. In one example the stepped-mirror reflector includes a plurality of mirrors each having a progression of delay distances relative to one another. Each of the plurality of mirrors may have a same reflecting angle.

According to another embodiment, a method of non-retro-reflective imaging in an optical imaging system comprises segmenting a source image into a plurality of image slices, each image slice having an image volume, individually reimaging the plurality of image slices onto a tilted image plane tilted with respect to an optical axis of the optical imaging system such that the image volume of each image slice overlaps the tilted image plane, and reconstructing a substantially in-focus image at the tilted image plane from the plurality of image slices.

In one example segmenting the source image and reimaging the plurality of image slices include focusing the plurality of image slices onto the tilted image plane using an array of lenses. Focusing the plurality of image slices may include focusing each image slice with a respective lens of the array of lenses, each lens having a different focal length. In another example segmenting the source image and reimaging the plurality of image slices include reflecting the plurality of image slices onto the tilted image plane using an array of mirrors. Reflecting the plurality of image slices may include reflecting each image slice with a same reflecting angle. The method may further comprise focusing incident electromagnetic radiation along the optical axis to provide the source image.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to an imaging system that eliminates the currently unavoidable (with conventional imaging systems) tell-tale retro-reflection from optical systems. In addition, according to certain aspects, the cost, weight and/or size of the imaging system may be reduced, while also improving the overall system capability, as discussed further below. According to one embodiment, a tilted imaging plane is used in combination with a structured relay optic (such as a mirror or lens) to obtain a non-retro-reflective imaging system. As discussed in more detail below, the relay optic may be segmented into sub-elements, such that the source is effectively "sliced" or "segmented," and configured to re-image each of the slices individually onto a rotated image plane such that the entire image is faithfully reconstructed. In this manner, a segmented image plane is achieved, tilted or rotated in angle with respect to the optical axis of the optical system. The tilted image plane results in the optical system being non-retro-reflective, while the segmentation of the image plane allows a substantially in-focus image to be maintained.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
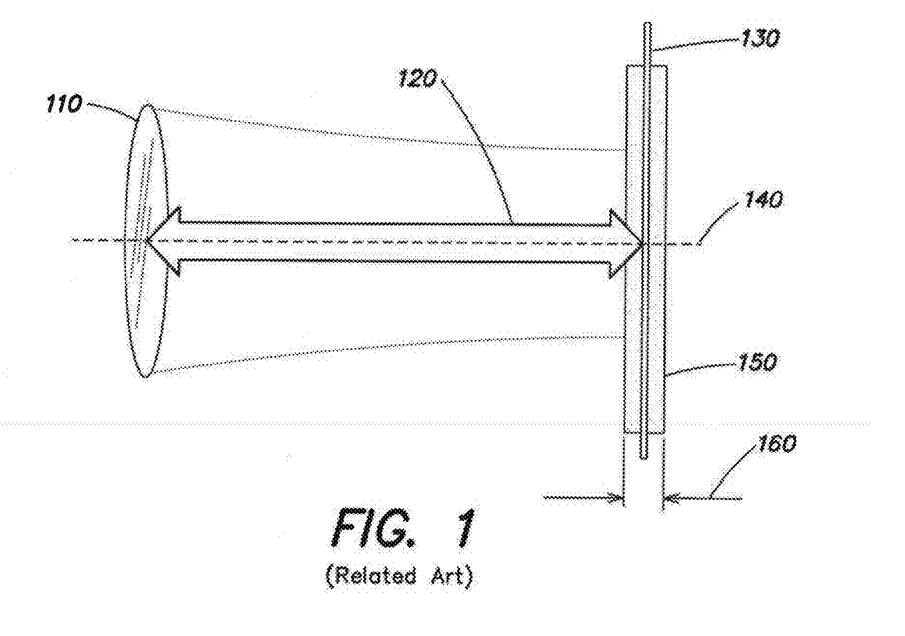
FIG. 1 is a diagram of one example of a conventional, retro-reflective imaging system.

Referring to FIG. 1, there is illustrated an example of a conventional imaging system. A lens 110 focuses light 120 onto a focal plane array (or other image sensor) 130 that is positioned normal to the optical axis 140 (along which the light 120 travels). The image formed by this system is in focus over the entire image area (not shown) because the image volume 150, that corresponds to the depth of focus 160 of the system multiplied by the image area (not shown), overlaps the surface of the focal plane array 130. As illustrated in FIG. 1, in this example, the image is retro-reflected back along the optical axis 140. This type of conventional system may provide good image formation; however, the retro-reflection makes it easily detectable by optical augmentation techniques, as discussed above.

Figure 2:
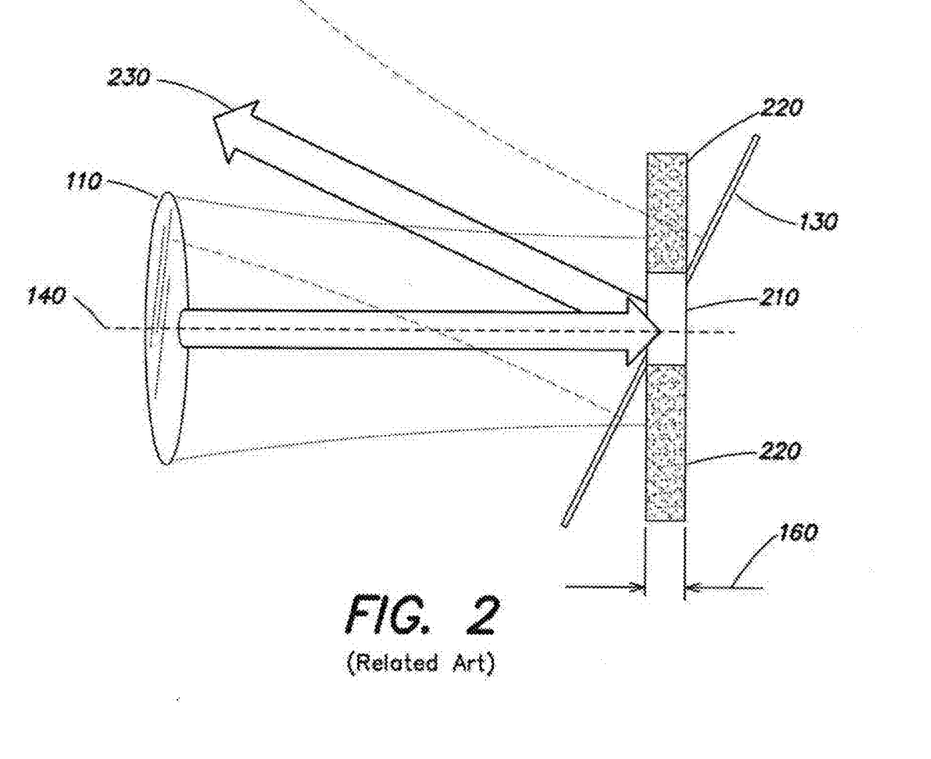
FIG. 2 is a diagram of an example of a misaligned, conventional imaging system that avoids retro-reflection at the expense of image quality (focus)

Retro-reflection may be avoided by tilting or rotating the focal plane array 130 relative to the optical axis 140, as illustrated in FIG. 2. However, absent other modifications to the system, the image formation is poor due to the majority of the image being out of focus. In the example illustrated in FIG. 2, the surface normal of the focal plane array 130 is tilted by a few degrees with respect to the optical axis 140. Sufficient tilting will avoid retro-reflection. However, as a result of the tilting, only a small portion 210 of the image volume overlaps the focal plane array 130, with the majority 220 of the image volume having little or no overlap with the focal plane array, resulting in a blurry image. Thus, although such a system is not retro-reflective (as shown, the reflected light 230 does not return to the lens 110), the image is essentially useless.

Thus, to eliminate the possibility of re-imaging reflected source light from the image sensor 130 back onto the source (retro-reflection), it is desirable to generate a tilted image plane. However, as demonstrated above, merely tilting the focal plane array in a conventional imaging system renders the image blurry. Aspects and embodiments of the present invention provide imaging systems and methods to create an image that remains in focus over the image sensor area, but such that the light is not normally incident upon the surface of the sensor, and is therefore not retro-reflected. According to one embodiment, a non-retro-reflective imaging system may be implemented by "slicing" the image volume and reconstructing the image from the slices, as discussed in more detail below. The image volume may be sliced by changing the position of the focus, such that each slice has a depth of focus that overlaps a region of a tilted image plane. As a result, an in-focus image may be reconstructed from a group of in-focus image slices, as discussed below.

Figure 3:
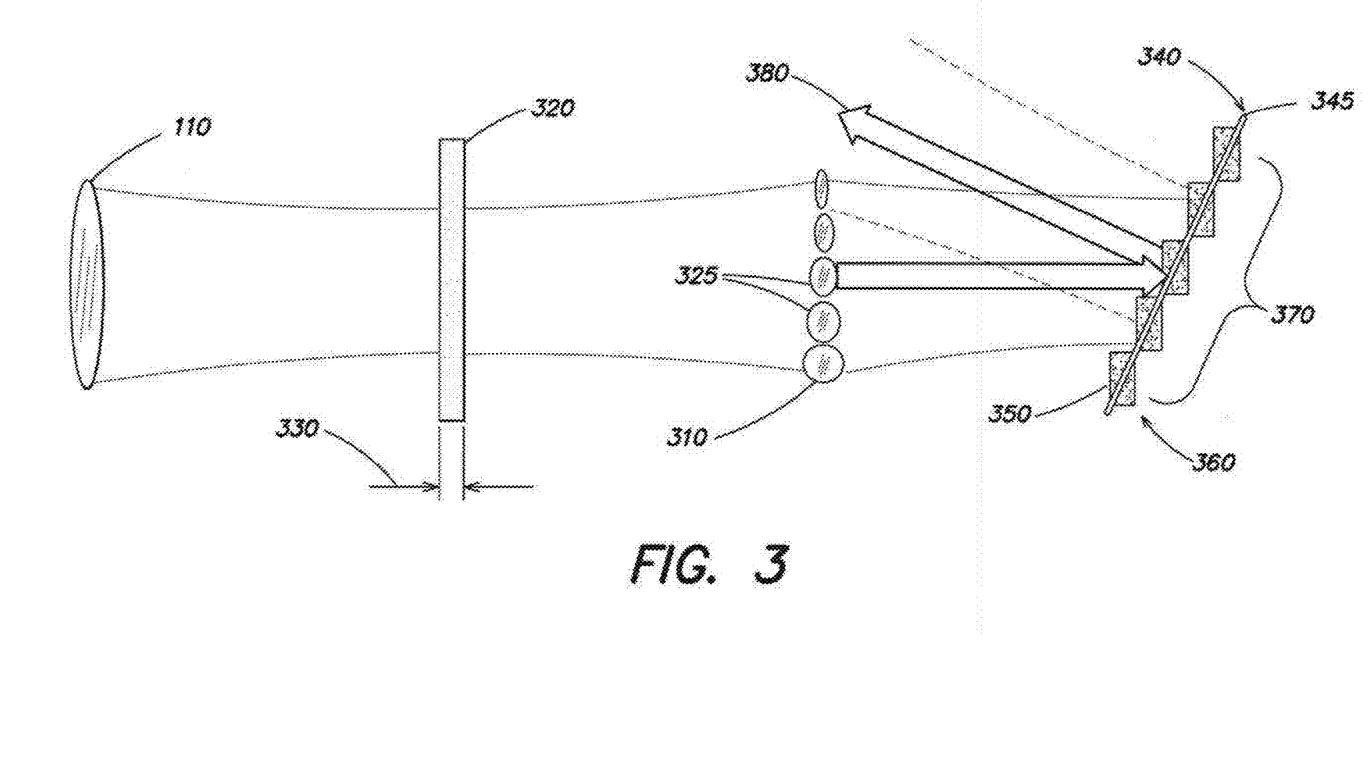
FIG. 3 is a diagram of one example of a non-retro-reflective sliced source optical imaging system according to aspects of the invention.

Referring to FIG. 3 there is illustrated a schematic representation of one example of a non-retro-reflective imaging system according to one embodiment. A lens or other fore-optics 110 may be used to focus incident light into the imaging system toward a relay optic 310. An image having an image volume 320 and depth of focus 330 is formed by the foreoptics 110 at a first image plane, and is reimaged by the relay optic 310 onto a second, tilted image plane 340. An imaging detector or sensor 345, such as a focal plane array (FPA), for example, is aligned with the tilted image plane 340. The relay optic 310 is configured to slice the image volume 320 into a plurality of slices 350 and reimage each slice individually onto the second image plane 340. In one example, the relay optic 310 is configured to reimage each slice at a slightly different focus position, such that the depth of focus 360 of each slice 350 overlaps the second image plane 340. In this manner, a substantially complete overlap 370 may be achieved between the tilted image plane 340 and the reconstructed image volume comprised of the plurality of slices 350. Thus, substantially the entire image may be in focus, and reflections 380 are off-axis with respect to the optic axis. As a result, excellent image formation may be achieved in a system that is not retro-reflective.

The relay optic 310 may be implemented using an array of lenses and/or or mirrors. In one example the relay optic 310 is segmented into sub-elements, each with the same reflecting angle, but with a uniform progression of delay distances relative to one another such that the image slices have different optical path lengths, as illustrated in FIG. 3. However, in other examples the reflecting angles may be different. In one example, the relay optic 310 is a lenslet array comprised of a plurality of lenslets 325 each having a different focal length. Since each lenslet 325 has a different focal length, each lenslet forms an image portion (corresponding to a slice 350) at a slightly different distance from the relay optic 310. The focal lengths of the lenslets 325 may be selected such that the distances at which the image slices 350 are formed corresponds to the tilt of the image plane 340, and the depth of focus of each slice overlaps the sensor 345 positioned on the image plane, as illustrated in FIG. 3. In other examples, depending on the overall optical design, the focal length of the lenslets may be the same.

In addition, although the example illustrated in FIG. 3 uses a lenslet array to achieve the image slices 350, other optical elements may be used, such as a faceted or stepped mirror, an array of mirrors, or a deformable mirror, such as may be used for adaptive optics applications, for example. A deformable mirror may be controlled to alter the waveform, by altering the shape of the deformable mirror or selected portions thereof, to produce the group of image slices. As discussed above, the relay optic 310 may be implemented in numerous different ways and, regardless of physical implementation, functions to "slice" the source image and reimage each of the slices individually onto a rotated image plane such that a substantially in-focus reconstruction of the entire image is obtained, while substantially eliminating retro-reflection from the system.

As discussed above, if the depth of field (or depth of focus) of each image slice 350 overlaps the rotated or tilted image sensor 345, then the resulting image remains in focus. There will be no retro-reflection from the system provided that the angle of tilt or rotation of the image plane 340 is sufficiently large, as discussed further below. In addition, to minimize loss of light, and therefore image resolution and/or the imaging range of the system, it may be desirable to segment the image plane 340 into as few slices as possible. The slice height may be determined based on the angle of incidence (corresponding to the tilt of the image plane 340) and the depth of focus of each slice, which in turn may be determined at least in part by the f/# (pronounced "f"-number) of the corresponding lenslet. The number of slices required to produce a substantially completely in-focus image may depend on the size of the image sensor 325 and the slice height.

Figure 4:
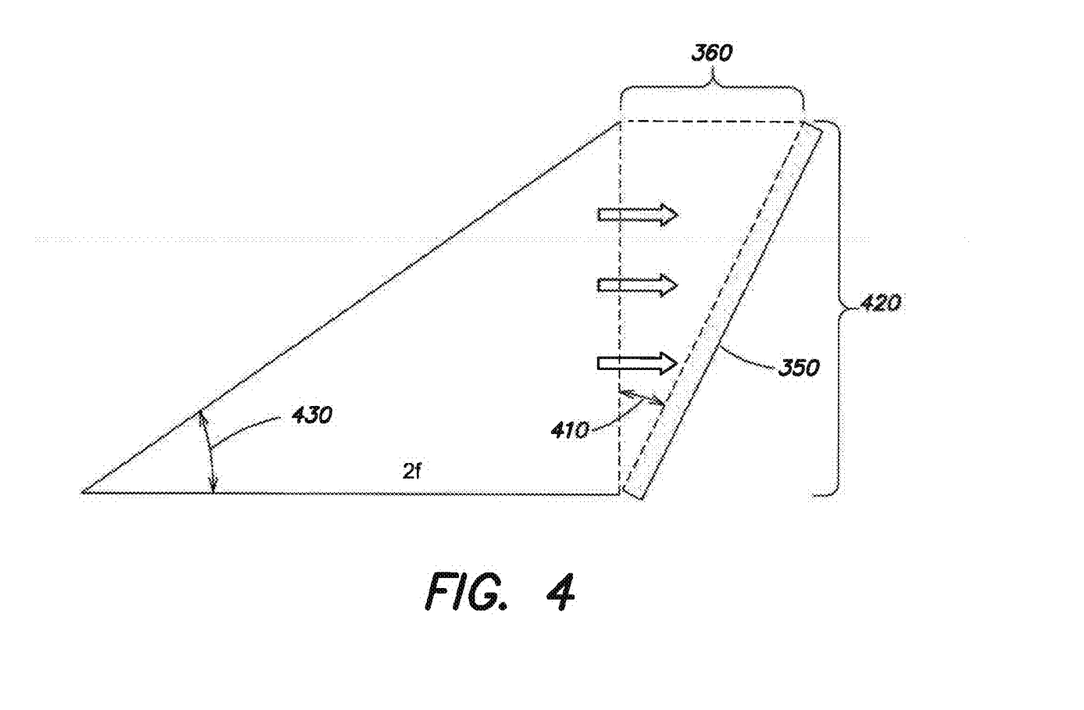
FIG. 4 is a diagram illustrating an example of the relationship between various parameters of a sliced source optical imaging system according to aspects of the invention.

FIG. 4 is a diagrammatic sketch illustrating, for one image slice 350, the relationship between the tilt angle 410, the depth of focus 360, the slice height 420, and the angle of acceptance 430 (for one simulated system). No retro-reflection occurs when the tilt angle (TA) 410 exceeds the angle of acceptance 430. The maximum value of the tilt angle 410 is determined by the depth of focus 360 and the slice height 420. The depth of focus (DoF) 360 of each image slice 350 is given by:

$$DoF \approx 2Nc \approx \frac{f^2}{1000 \cdot D} \quad (1)$$

In Equation (1), N is the f/# of the lens corresponding to that image slice, c is the corresponding circle of confusion, f is the focal length of the lens, and D is the diameter of the lens. Thus, for a lens having a focal length of 25 millimeters (mm) and N=1, the depth of focus (DoF) is 50 microns (μm), for example. Table 1 below provides some examples of depth of focus for various examples of lenses with different characteristics (focal length, diameter and f/#). Those skilled in the art will appreciate that the shorter the focal length of the lens (for a given diameter), the greater the light gathering capacity of the system.

TABLE 1

| f (mm) | Diameter (mm) | f/# | DoF (μm) |
|---|---|---|---|
| 25 | 25 | 1 | 50 |
| 35 | 25 | 1.4 | 98 |
| 50 | 25 | 2 | 200 |
| 82.5 | 25 | 3.3 | 545 |
| 100 | 25 | 4 | 800 |

As discussed above, the depth of focus is the range of distance over which the image remains in focus, and therefore provides the "tolerance" on the location of the image sensor 345. Thus, large f/# systems may be accommodated with relatively few slices, each having a limited depth of focus. However, to accommodate lower f/# systems, more slices may be needed. Table 2 below provides some examples of the relationship between the various parameters and characteristics discussed above. The angle of acceptance data presented in Table 2 is calculated based on the schematic shown in FIG. 4. In general, the acceptance angle for various other configurations may relate to the field of view of the optical system. The numbers of slices specified in Table 2 are based on a 25 mm diameter FPA.

TABLE 2

| Horizontal f/# | DoF (μm) | Angle of acceptance (degrees) | Slice height (mm) | No. of slices | Relative % of light admitted |
|---|---|---|---|---|---|
| 1 | 50 | 1.8 | 1.6 | 16 | 6 |
| 1.4 | 98 | 2.0 | 2.5 | 10 | 10 |
| 2 | 200 | 2.4 | 4.2 | 6 | 17 |
| 3.3 | 545 | 2.9 | 8.3 | 3 | 33 |
| 4 | 800 | 3.6 | 12.5 | 2 | 50 |

Figure 5A:
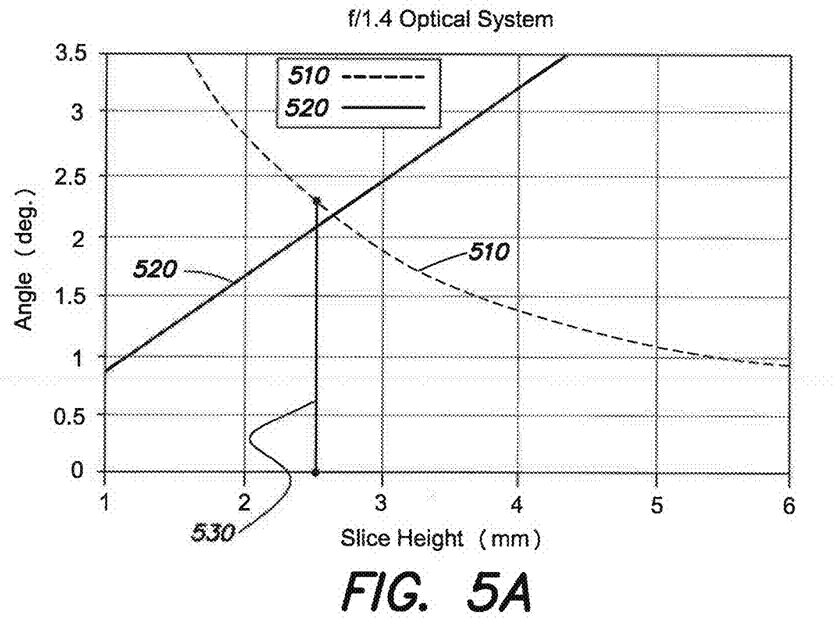
FIG. 5A is a graph illustrating maximum tilt angle and acceptance angle as a function of slice height for an f/1.4 optical system according to aspects of the invention.
Figure 5B:
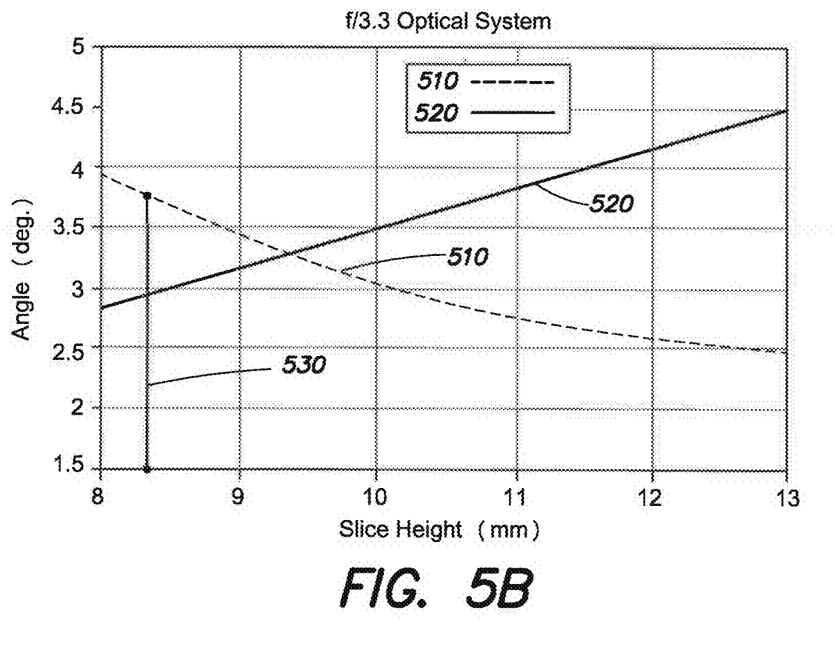
FIG. 5B is a graph illustrating maximum tilt angle and acceptance angle as a function of slice height for an f/3.3 optical system according to aspects of the invention.

FIGS. 5A and 5B are graphs illustrating the relationship between the maximum tilt angle 410, the acceptance angle 430, and the slice height for example optical systems with different f/#. FIG. 5A corresponds to an f/1.4 optical system and FIG. 5B corresponds to an f/3.3 optical system. In both FIG. 5A and FIG. 5B, trace 510 represents the maximum tilt angle 410, and trace 520 represents the acceptance angle. Line 530 in FIGS. 5A and 5B indicates the largest slice height that provides equal slices with an FPA tilt angle greater than the acceptance angle, such that the optical system is not retro-reflective. It will be appreciated by those skilled in the art, given the benefit of this disclosure, that an underlying assumption in this discussion is that when/if the tilt angle of the focal plane is equal to or greater than the acceptance angle, there system will not exhibit retro-reflection.

Table 3 below provides various examples of configurations and characteristics, including the number of slices, focal lengths of the lens for each slice, etc., that are consistent with respect to tilt angle, f/#, sensor size, etc., for an optical system (such as that illustrated in FIG. 3) which may achieve a substantially complete overlap 370 of the reconstructed image volume on the tilted image plane 340. The data presented in Table 3 presumes that all "slices required" have equal height.

TABLE 3

| Focal Length (mm) | DoF (μm) | Image sensor size (mm) | Tilt angle (degrees) | Slice height (μm) | Approx. # Slices Required |
|---|---|---|---|---|---|
| 25 | 50 | 10 | 5 | 574.0 | 17 |
| 25 | 50 | 10 | 10 | 288.1 | 35 |
| 25 | 50 | 10 | 25 | 118.4 | 84 |
| 25 | 50 | 20 | 5 | 574.0 | 35 |
| 25 | 50 | 20 | 10 | 288.1 | 69 |
| 25 | 50 | 20 | 25 | 118.4 | 169 |
| 50 | 100 | 10 | 5 | 1148.0 | 9 |
| 50 | 100 | 10 | 10 | 576.2 | 17 |
| 50 | 100 | 10 | 25 | 236.7 | 42 |
| 50 | 100 | 20 | 5 | 1148.0 | 17 |
| 50 | 100 | 20 | 10 | 576.2 | 35 |
| 50 | 100 | 20 | 25 | 236.7 | 84 |

As discussed above, and as may be seen with reference to Tables 1-3, small tilt angles may be accommodated with relatively few slices. However, a very small tilt angle may be insufficient to ensure that the system in fully non-retro-reflective. Larger tilt angles may be accommodated by either using more slices or slices having a larger depth of focus.

As discussed above, in certain embodiments, a sliced or segmented image plane 340 may be achieved using a lenslet array, as illustrated in FIG. 3. In one example, the lenslet array may include a plurality of individual lenses that are positioned accurately with respect to one another to provide the array. For example, individual lenses may be coupled to a common array substrate. However, the accurate positioning, alignment and attachment of multiple individual lenses to an array substrate may pose challenges or be undesirable in some circumstances. Accordingly, in other embodiments, machining techniques, such as diamond-turning techniques, may be used to produce a monolithic optical array. As discussed above, in one embodiment, the lenslets within such a monolithic array may have different focal lengths to produce the image slices at different distances. In other embodiments, the relay optical element may include a mixed array of lenses and mirrors, which may also be produced using diamond-turning techniques, for example.

In certain embodiments, as discussed above, foreoptics 110 may be used to focus incoming light toward the relay optic 310, and may include any type of optical element configured to perform this function. In other examples, however, the relay optic may be used without additional foreoptics. In one embodiment, the foreoptics 110 may include a pinhole aperture. In one such example, an object at infinity is imaged through a pinhole aperture in a substrate at a distance equal to the focal length. A relay optic is used to slice the image, as discussed above. The use of an aperture for the foreoptics, rather than a reflecting and/or refracting optical element, such as a glass element, may be advantageous in that it may eliminate glint associated with most optical elements. In addition, the use of the aperture may reduce the cost and weight of the optical system by removing heavy and/or expensive foreoptic mirrors and/or lenses. However, since the aperture is generally small, the amount of light admitted to the image plane may be relatively low, which may make the use of aperture foreoptics undesirable in applications where high resolution or long range imaging is desired.

In one example, for applications where light throughput may be of particular concern, a pinhole array may be used in place of a single aperture. In addition to increasing the transmitted light to the imaging sensor, other advantages may be realized by patterning the pinhole array to function as a coded aperture. In such examples, image processing may be required to recover the image; however, the image processing necessary may be simplified though judicious choice of the array pattern. Use of a coded aperture may allow for passive ranging of objects in the image from a single image sensor (e.g., a single focal plane array sensor).

Thus, aspects and embodiments may provide optical imaging systems that allow for excellent image formation, while also being non-retro-reflective. Through sliced source imaging, optical augmentation devices may be defeated, such that optical imaging systems according to various embodiments may be used for covert imaging. As discussed above, one or more relay optical elements, such as lens or mirror arrays, are used to tilt and segment the image plane, such that a clear image is formed without retro-reflection. The function and advantages of these and other embodiments will be more fully understood from the following examples. The examples are intended to be illustrative in nature and are not to be considered as limiting the scope of the systems and methods discussed herein.

EXAMPLES

Figure 6:
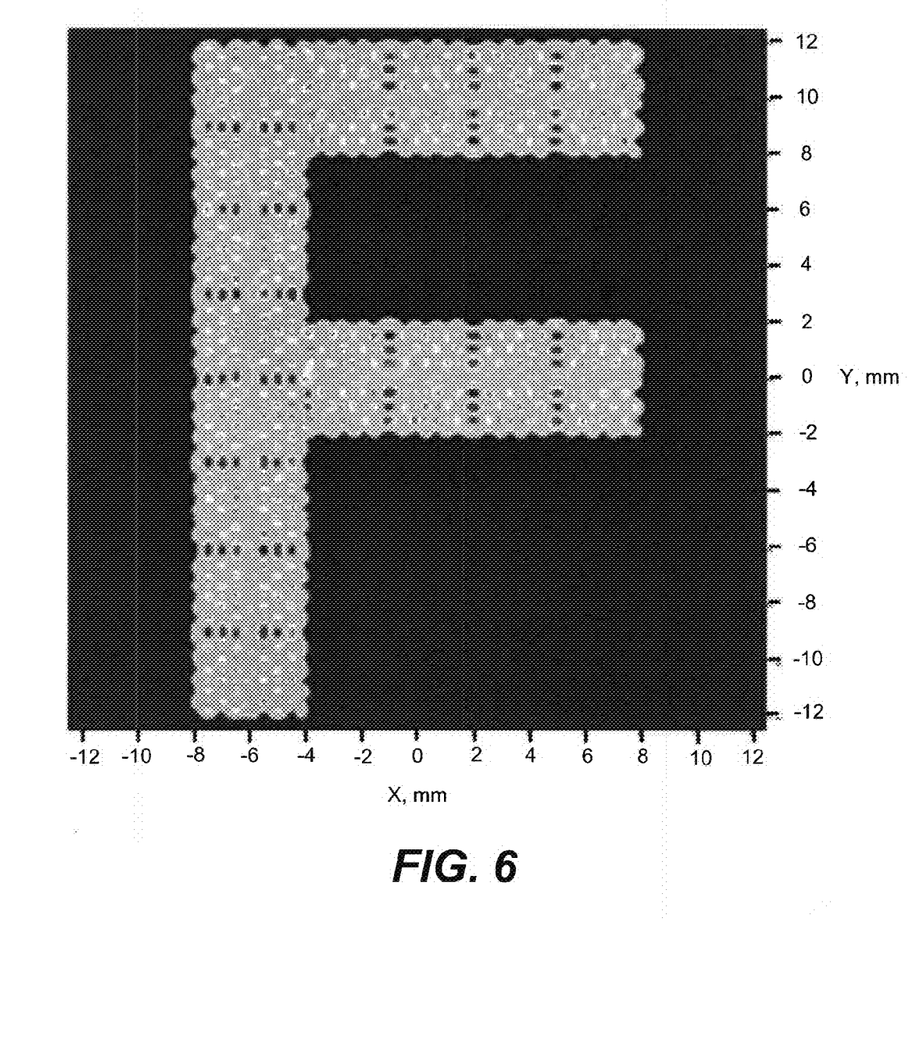
FIG. 6 is an illustration of a source image used for simulations discussed herein in accord with aspects of the invention.

A software program known as LightTools™ available from Optical Research Associates, now part of Synopsys®, was used to create a three-dimensional modeling environment for the simulation of examples of optical systems using sliced sources (segmented image planes) according to aspects of the present invention. Non-sequential ray traces were used to obtain the simulation results presented herein. It is to be appreciated that the simulations discussed herein were linear; however, the human eye is a logarithmic detector. In the imaging simulations, a "thin" (i.e., two-dimensional) source having the shape of the capital letter F was used, as illustrated in FIG. 6. For the simulations, the "F" had a height of 24 mm (in the y dimension) and a width of 16 mm (in the x dimension). The resolution was 150 by 150 pixels.

Example 1

Figure 7:
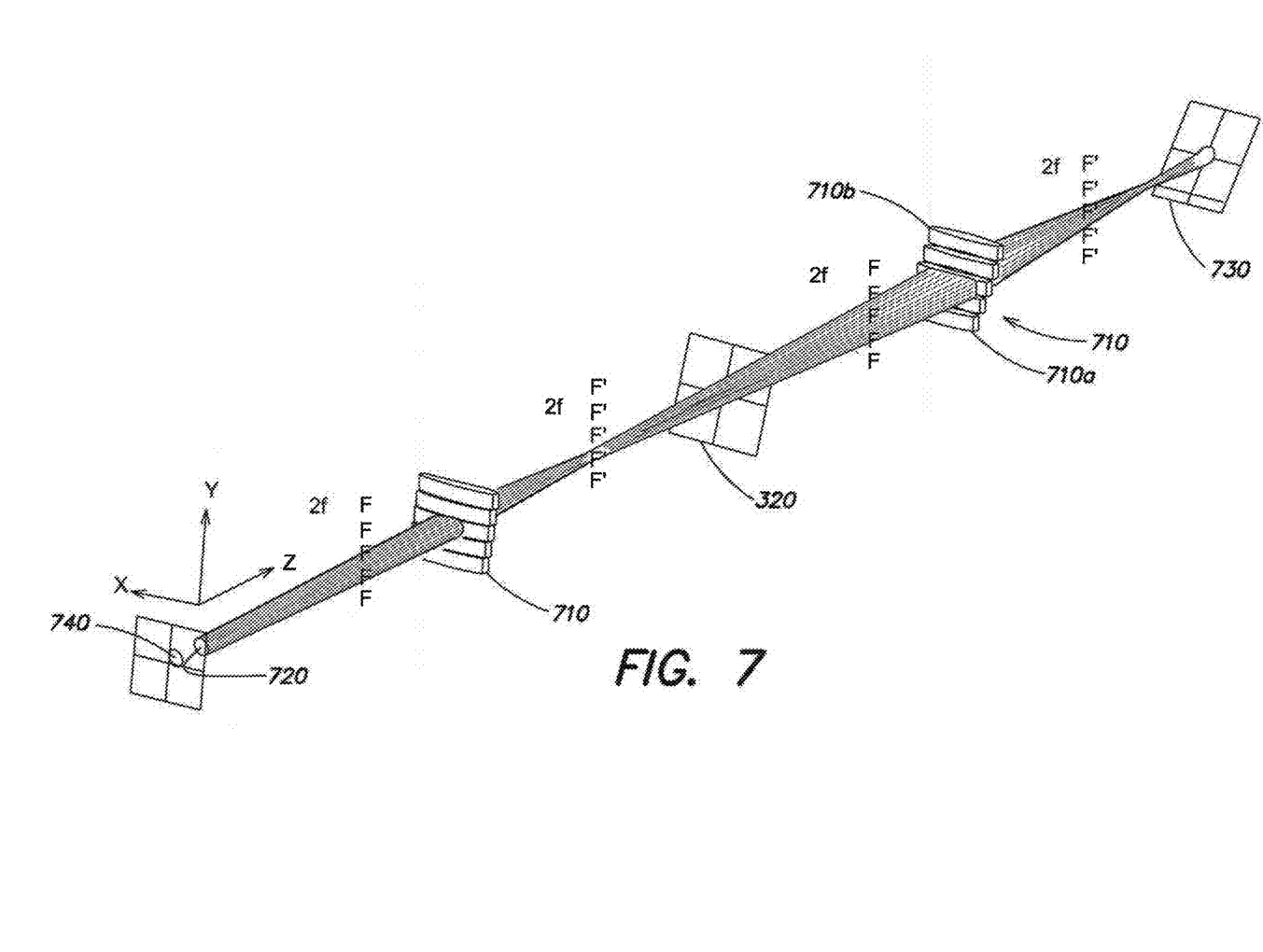
FIG. 7 is a representation of a modeled (lens based) optical system used to simulate an imaging example according to aspects of the invention.

FIG. 7 illustrates the model optical system used for this example. This example demonstrates that a tilted image plane may be used to produce a non-retro-reflective imaging system in which all retro-reflective rays are eliminated. In this example, an array 710 of five lenses was used to produce the segmented image. The simulation example of FIG. 7 included two lens arrays 710 to produce an upright image (since the individual image segments are inverted at the intermediate image plane 320). As discussed above, a thin source 720 in the shape of an F, as illustrated in FIG. 6, was located at the origin. A receiver 730 was placed aligned with the tilted image plane to obtain an image of the source. The simulated receiver had display dimensions of 25 mm by 25 mm, and 150 by 150 pixels.

Figure 8:
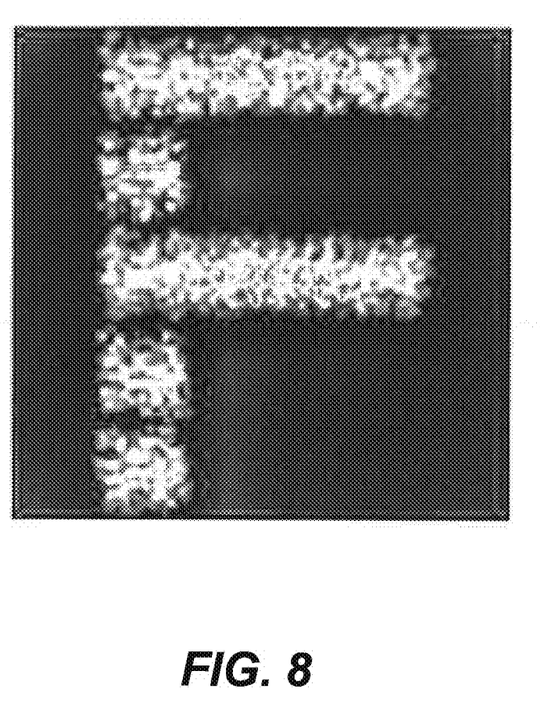
FIG. 8 is an illustration the simulated image obtained from simulations using the modeled optical system of FIG. 7 and the source image of FIG. 6.

For this simulation, lens arrays 710 having f/3 was used. Ten million rays were traced in forward simulations. Perfect transmission by the lens arrays 710 was assumed. Each of the five lenses of the lens arrays 710 were simulated with a 0.5 mm offset in focal length relative to one another. The "bottom" lens 710*a* had a focal length of 74 mm, the next lens a 74.5 mm focal length, the next lens a 75 mm focal length, the next lens a 75.5 mm focal length, and the "top" lens 710*b* a 76 mm focal length. Thus, the path length difference between rays focused by the top lens 710*b* system and the bottom lens 710*a* system was 16 mm (the system shown has an optical path of 8 f for each segment), thereby producing the tilted image plane. FIG. 8 illustrates the resulting sliced image received at receiver 730 when the F shown in FIG. 6 was used as the source. As may be seen with reference to FIG. 8, the simulated system produced an excellent reproduction of the source image, demonstrating that a sliced source optical system with a tilted image plane is capable to producing a high quality image.

Example 2

Figure 9:
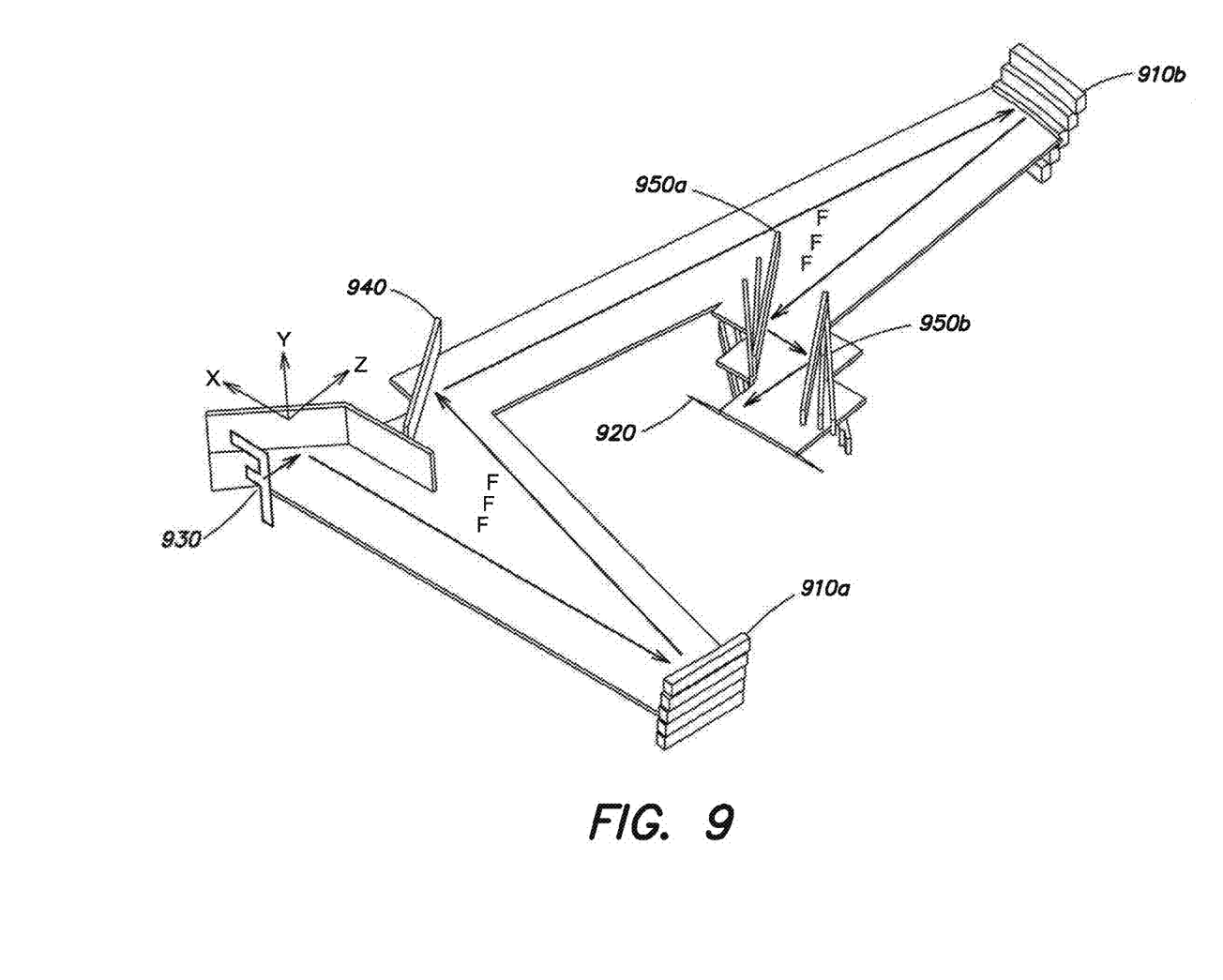
FIG. 9 is a representation of a modeled (minor based) optical system used to simulate an imaging example according to aspects of the invention.

As discussed above, in some embodiments a reflective relay optic array, rather than a lens array, may be used. In some applications, an all-reflective system rather than a system using lenses may be preferred. Accordingly, in this example, a reflective, mirror-based sliced source optical system was simulated. FIG. 9 illustrates the simulated model optical system. In this example, the relay optic was simulated as a stepped curved-mirror array 910. Similar to Example 1, two mirror arrays 910*a*, 910*b* were used to generate an upright image at the receiver 920. As discussed above, a thin source in the shape of an F, as illustrated in FIG. 6, was located at the origin 930. The receiver 920 was aligned with a tilted image plane to obtain an image of the source. The simulated receiver had display dimensions of 25 mm by 25 mm, and 150 by 150 pixels. In this example, the two stepped-mirror arrays 910*a* and 910*b* are composed of five bi-conic curved mirrors. Each of the stepped-mirror arrays 910 was configured for an f/3 system, similar to Example 1, and a 15 degree folding angle. A fold mirror array (plane mirrors) 940 was used to redirect the light rays for a compact design. Plane mirror arrays 950*a* and 950*b* were used to re-overlap the beams from the stepped-mirror array 910*b* onto the detector 920 located at the image plane.

Figure 10:
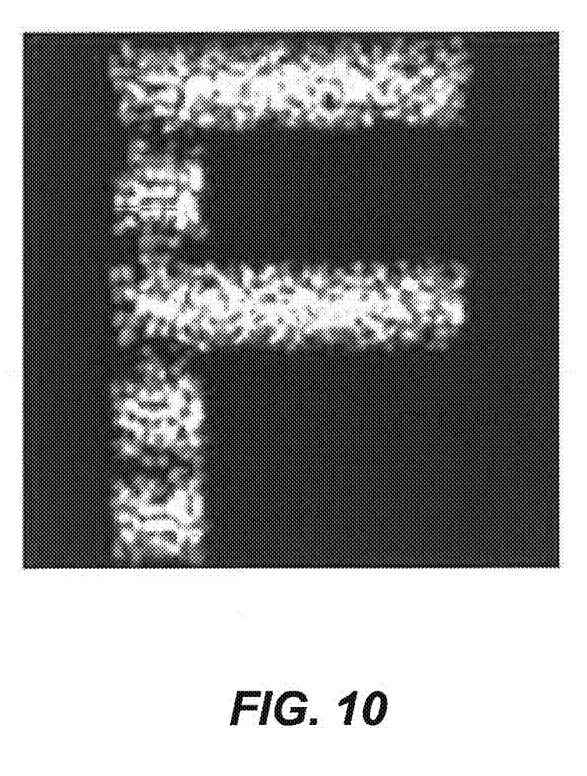
FIG. 10 is an illustration the simulated image obtained from simulations using the modeled optical system of FIG. 9 and the source image of FIG. 6.

For this simulation, 10 million rays were traced in forward simulations, and perfect reflection by the mirrors was assumed. Only first order corrections were applied to the focal lengths along the vertical and horizontal axes to account for non-normal incidence. No higher order corrections for spherical aberration were simulated in this example. FIG. 10 illustrates the resulting sliced image received at receiver 920. As may be seen with reference to FIGS. 6 and 10, the simulated system produced an excellent reproduction of the source image, demonstrating that a sliced source optical system with a tilted image plane is capable of producing a high quality image.

Although not shown in FIG. 7 or FIG. 9, baffles were simulated in between the lens 710 and stepped curved-mirror arrays 910 to block cross-over. This resulted in increased vignetting (light loss) between image segments but may be avoided in other embodiments.

Example 3

As discussed above, bright collimated beams of light are used by optical augmentation systems to search for optical devices. Conventional systems are retro-reflective and generate a return (retro-reflection) when illuminated by such seeker beams ("cat's eye" effect). Primarily, these retro-reflections are used by optical augmentation probes to detect optical devices. Additionally, however, different wavelengths of such beams may be used to countermeasure anti-reflective coatings and obtain glint from lenses. Glint is a reflection from an optical surface which may be produced by any light source in any location, and does not in general return to its origin. Optical augmentation probes used outside of the anti-reflective coating range on a lens-based system produce glint, which may be used to detect the optical devices.

In this example, the retro-reflective properties (or lack thereof) of the modeled system of FIG. 9 were simulated.

A collimated source was simulated to represent a typical laser used by optical augmentation systems. In the modeled system of FIG. 9, a mirror was placed at the image plane, replacing the detector 920. The mirror was modeled as 100% reflecting. A sensor was placed behind the origin 930 to receive retro-reflected rays from the system. Reflection was measured as counts versus mirror angle for the mirror located at the image plane. Table 4 below presents the simulated results for this example.

TABLE 4

| Mirror Angle (degrees) | % Light Returned |
| --- | --- |
| 0 | 13.490* |
| 1 | 5.051* |
| 2 | 0.00000000** |

*1 million rays simulated
**100 million rays simulated

It is important to note that retro-reflected rays are a subset of total rays reflected. This example demonstrates that even for a modest tilt of the image plane, the system exhibits little to no reflection, and thus little to no retro-reflection. In addition, as shown in FIG. 10, the resulting image is in focus and of good quality even for a tilted image plane.

By contrast, for a similar simulated optical system, but without segmented mirror arrays (mirror arrays 910 replaced with conventional mirrors and mirror arrays 950 eliminated since without the segmentation, there is no need to re-overlap the beams), 6 degrees of rotation of the image plane was required in the simulated example to produce zero reflection. With a six degree tilt in this conventional system, 83% of the image is out of focus. In this simulation, a two degree mirror tilt resulted 50.912% of the light being returned, meaning that the system would be highly retro-reflective.

Thus, these examples demonstrate that an optical system according to aspects of the invention which uses a segmented lens or mirror array to produce a segmented, tilted image plane can produce in-focus images of good quality while being non-retro-reflective, unlike conventional optical systems.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A non-retro-reflective imaging system comprising:
   foreoptics configured to receive and focus incident electromagnetic radiation to provide a source image having an image volume;

a segmented relay optic configured to receive the source image and to reimage the source image onto a tilted image plane that is tilted so as to be non-perpendicular with respect to an optical axis of the imaging system, the segmented relay optic further configured to slice the image volume into a plurality of image slices and spatially position the plurality of image slices such that a depth of focus of each image slice overlaps the tilted image plane; and an image sensor co-aligned with the tilted image plane and configured to produce a reconstructed and substantially in-focus image from the plurality of image slices;

wherein a tilt angle of the tilted image plane with respect to the optical axis of the imaging system exceeds an angle of acceptance of the foreoptics, thereby preventing retro-reflection of the incident electromagnetic radiation.

2. The non-retro-reflective imaging system of claim 1, wherein the segmented relay optic includes an array of mirrors.

3. The non-retro-reflective imaging system of claim 1, wherein the segmented relay optic includes an array of lenses.

4. The non-retro-reflective imaging system of claim 3, wherein each lens in the array has a different focal length so as to produce the tilted image plane.

5. The non-retro-reflective imaging system 3, wherein the array of lenses includes a plurality of individual lenses coupled to a common substrate.

6. The non-retro-reflective imaging system of claim 3, wherein the array of lenses includes a monolithic lenslet array.

7. The non-retro-reflective imaging system of claim 1, wherein the foreoptics includes at least one lens.

8. The non- retro-reflective imaging system of claim 1, wherein the foreoptics includes a pinhole aperture.

9. The non-retro-reflective imaging system of claim 1, wherein the segmented relay optic includes a stepped-mirror reflector.

10. The non-retro-reflective imaging system of claim 9, wherein the stepped-mirror reflector is configured to produce a saw-tooth wavefront having a plurality of substantially flat fronts displaced in distance along the optical axis of the optical imaging system to produce the tilted image plane.

11. The non-retro-reflective imaging system of claim 9, wherein the stepped-mirror reflector includes a plurality of mirrors each having a progression of delay distances relative to one another.

12. The non-retro-reflective imaging system of claim 11, wherein each of the plurality of mirrors has a same reflecting angle.

13. A method of non-retro-reflective imaging in an optical imaging system comprising:

receiving incident electromagnetic radiation with foreoptics;

focusing the incident electromagnetic radiation along an optical axis of the optical imaging system to provide a source image;

segmenting the source image into a plurality of image slices using an array of lenses, each image slice having an image volume;

individually reimaging and focusing the plurality of image slices onto a tilted image plane with the array of lenses, each lens of the array having a different focal length and the tilted image plane being tilted by a tilt angle so as to be non-perpendicular with respect to the optical axis of the optical imaging system such that the image volume of each image slice overlaps the tilted image plane, the tilt angle exceeding an angle of acceptance of the foreoptics so as to prevent retro-reflection of the incident electromagnetic radiation; and reconstructing a substantially in-focus image at the tilted image plane from the plurality of image slices.

14. A method of non-retro-reflective imaging in an optical imaging system comprising:

receiving incident electromagnetic radiation with foreoptics;

focusing the incident electromagnetic radiation along an optical axis of the optical imaging system to provide a source image;

segmenting the source image into a plurality of image slices using an array of mirrors, each image slice having an image volume;

individually reflecting and reimaging the plurality of image slices onto a tilted image plane with the array of mirrors, the tilted image plane being tilted by a tilt angle so as to be non-perpendicular with respect to an optical axis of the optical imaging system such that the image volume of each image slice overlaps the tilted image plane, the tilt angle exceeding an angle of acceptance of the foreoptics so as to prevent retro-reflection of the incident electromagnetic radiation; and reconstructing a substantially in-focus image at the tilted image plane from the plurality of image slices;

wherein reflecting the plurality of image slices includes reflecting each image slice with a same reflecting angle.

* * * * *